H. C. MEYER.
DOUBLE FAUCETS FOR BATHS, &c.
No. 186,685. Patented Jan. 30, 1877.
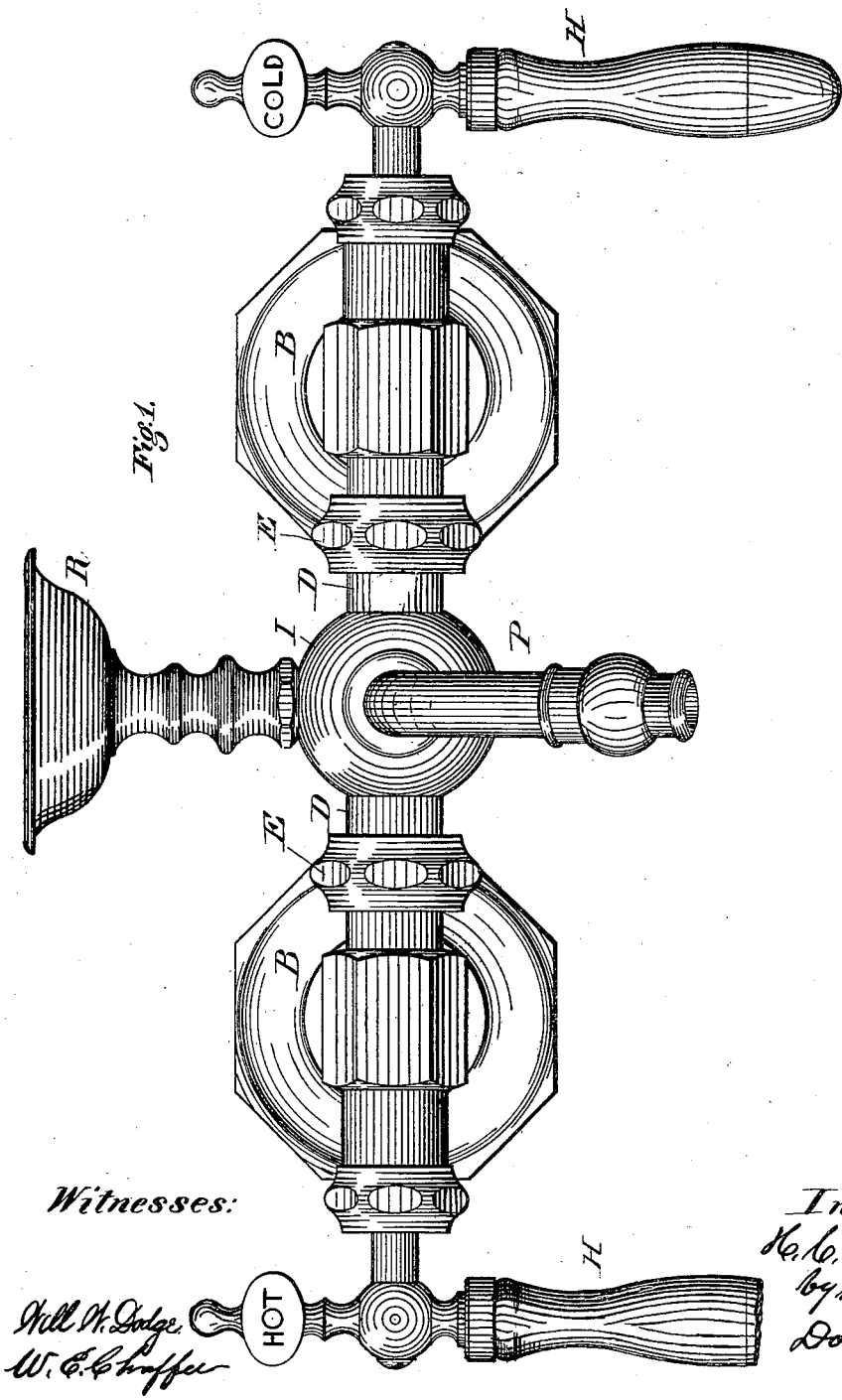

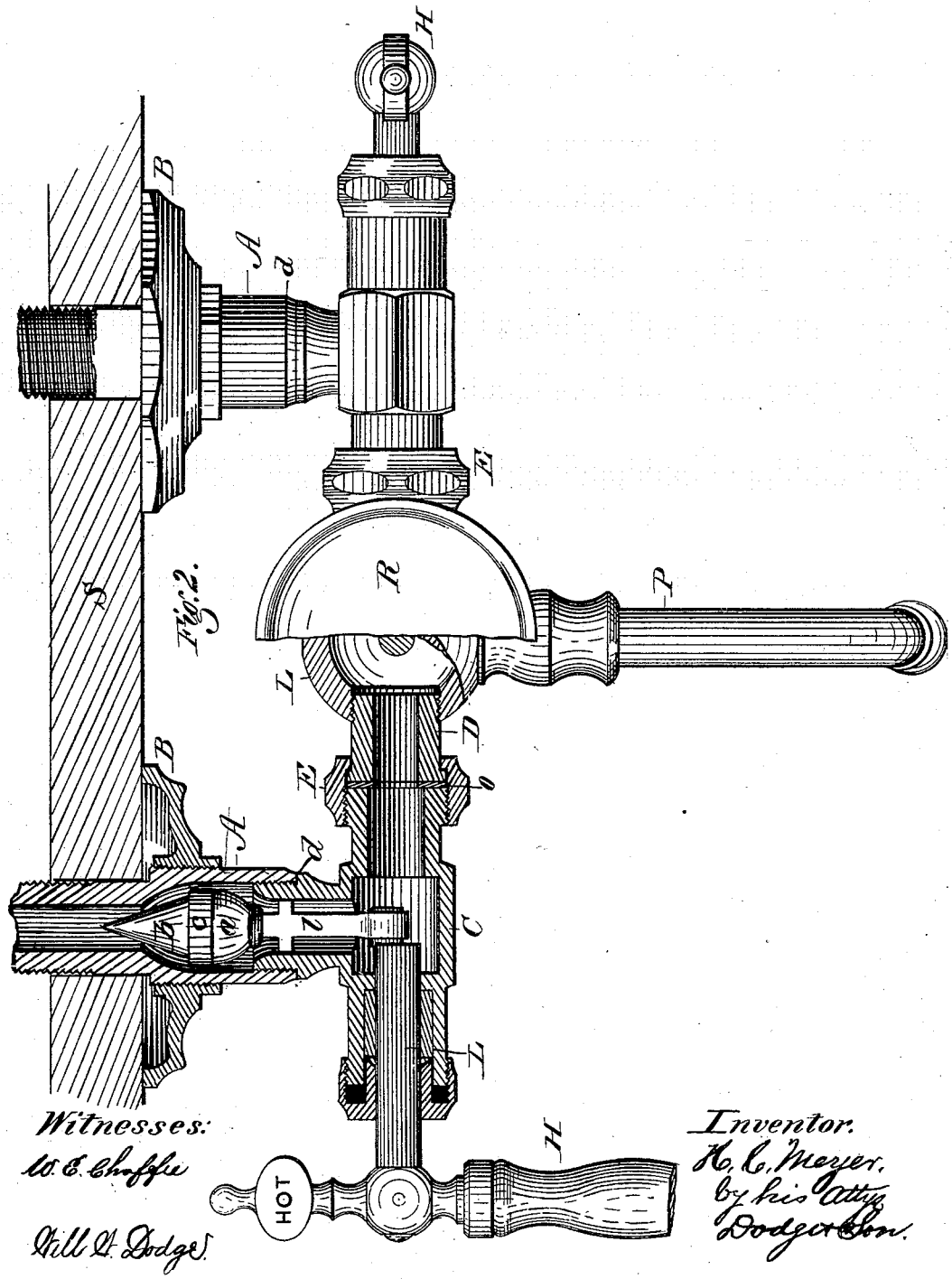

UNITED STATES PATENT OFFICE.

HENRY C. MEYER, OF NEW YORK, N. Y.

IMPROVEMENT IN DOUBLE FAUCETS FOR BATHS, &c.

Specification forming part of Letters Patent No. 186,685, dated January 30, 1877; application filed January 9, 1877.

*To all whom it may concern:*

Be it known that I, HENRY C. MEYER, of New York, in the county of New York and State of New York, have invented certain Improvements in Double Faucets for Baths, &c., of which the following is a specification:

My invention relates to compound or double faucets or water-cocks, for use in connection with bath-tubs or wash-basins, by which either hot or cold water, or both, may be drawn at pleasure; and the invention consists in the manner of constructing the apparatus, whereby all the operating parts shall be in front of the wall or slab, or whatever the cock is attached to, so that they may be readily reached without tearing away the wall or other parts, and in so constructing and connecting the two cocks as to enable them to be separated and detached whenever necessary, for repairs or otherwise, all as hereinafter more fully described.

Figure 1 is a front elevation; and Fig. 2 is a top-plan view, shown partly in section.

To carry out my invention, I prefer the well-known Fuller faucet or cock, in which, as shown in Fig. 2, an elastic plug or valve, $a$, is used, this valve $a$ being covered at its rear end by a metal cap, $c$, and having a conical nut, $b$, screwed on behind it, by which the elastic valve can be expanded to compensate for wear, and to make it fit its seat, in case it should not otherwise do so, the object of making the nut conical being to break the force of the flowing stream within the pipe when the water is shut off suddenly, and thereby preventing the concussion which usually occurs when the water is suddenly shut off, and which in time is apt to expand and finally burst the pipe.

So far as the present invention is concerned, all these features are old; but they have not heretofore been utilized or employed in the manner designed by my invention, which I will now proceed to describe in detail.

Compound or double faucets have heretofore been made both for bath-tubs and wash-basins; but their construction, when valves of this style were used, has been such that when it became necessary, for any reason, to take out the valve or operating parts, it could only be done by detaching the entire apparatus, and this necessitated cutting away the wall to get at the parts in rear of the tub or slab to which they were attached, or detaching and removing the tub, slab, or whatever they were fastened to.

It often happens, especially with new jobs of plumbing, that chippings of the lead pipe or other particles get into the pipes, and these, being forced along by the water, ultimately find their way into the faucets, thereby preventing the latter from closing or otherwise operating perfectly. So, too, in the ordinary course of use, foreign matter is at all times liable to get into the pipes and give trouble,; and it becomes necessary frequently to remove the faucets, not only for these reasons, but also for the purposes of repair.

The object of my invention is to enable this to be done without disconnecting the tubes of the faucets from the pipes, or detaching them from their support, or breaking, cutting, or otherwise injuring the wall, tub, slab, or whatever the faucets may be secured to.

In order to do this, I take two of the before-mentioned Fuller faucets, the body of which is represented by A in the drawings. As shown in Fig. 2, the body A is made of suitable form and length to extend through the back slab of a wash-basin, as indicated by S, or through any board or other support for them when applied to a bath-tub, as there shown, they projecting out forward far enough for an ornamental nut or plate, B, to be screwed thereon, and to permit the front part C of the faucet to be connected thereto, as shown by the screw-joint $d$.

This front part C is made so that when connected to the part A it will stand at right angles thereto, as shown in Figs. 1 and 2, so that the crank-rod L shall be in proper position to cause the eccentric on its inner end to connect with the valve-stem $l$, as shown in the left-hand part of Fig. 2, the part C extending, in the form of tube, some distance beyond the line of the body A, and having a screw-thread cut on its end, as shown in Fig. 2.

Having thus made two faucets just alike, with their parts C reversed, so as to bring their tubular ends opposite each other, I then provide the central part or connection, which consists of a central body or bulb, I, which has at its opposite sides two short projecting tubes, D, each provided at its outer end with a collar or shoulder, and a loose screw-coupling, E, the latter being slipped on before the tube D is fastened to the part I. Now, by inserting a packing-ring or gasket, O, between the abutting ends of the tubes C and D, and screwing up the couplings E on each side, the two faucets will be connected, so that water admitted through either or both will be discharged from the central part I through the nozzle or delivery-spout P. As shown in Fig. 1, a ring-cup, R, or other ornamental device, may be attached to the central part I; or, if desired, in lieu of this, or in addition thereto, a small tube or spout may be used for attaching a flexible tube with a sprinkler attached, this, of course, being required only when the faucet is applied to a bath-tub, or may be arranged for used in a barber-shop, or for a similar purpose.

The handles H, as shown in the drawings, are arranged at the opposite ends, and their upper ends are so made as to show, respectively, the words "hot" and "cold," to indicate the sides from which the hot or cold water is to be drawn.

It is obvious that other styles of coupling may be used, if desired, with the same results. For instance, the ends of the tubes C and D may be so prepared as to form a ground joint, and fit together, so as to dispense with any packing; or their ends may be made to abut against each other, and a flexible packing-ring be inserted between the shoulder of the tube C and the flange of the coupling E, these all being well-known methods of making tight joints.

When thus constructed and arranged it will be seen that the valves $a$ and all the operating parts are located in front of the back slab or support S; and that whenever it is desired to detach these parts for any reason whatever it is only necessary to unscrew the couplings E and take out the central or connecting part, when either faucet can be at once detached by unscrewing the joint $d$, and that this can be done without disconnecting the tubes or bodies A from the water-pipes, or from the slab or support S, thus saving much time and labor, and also the injury to the wall of fixtures which usually occurs when the ordinary style of faucet is used.

This method of construction is also very convenient, as it enables the parts to be finished separately, and handled with much greater ease while being manufactured and polished; and the apparatus, as a whole, is very neat and ornamental when completed. It may be modified in external form or appearance, as may be desired, without departing from the spirit of my invention, so long as the operating parts are arranged in front of the slab or support, and are made detachable, so they can be got at without disconnecting the bodies of the faucets from their supports.

Having thus described my invention, what I claim is—

A compound faucet, consisting of the two faucets A, each having a joint, $d$, in front of their point of support or attachment, in combination with a central connecting section, united thereto by the couplings E, or their equivalents, substantially as described, whereby the valves and their operating parts can be removed without disconnecting the faucets from the pipes or their supports, as set forth.

HENRY C. MEYER.

Witnesses:
JAMES CONITY,
W. C. DODGE.